United States Patent [19]

Edelman et al.

[11] Patent Number: 4,609,569

[45] Date of Patent: Sep. 2, 1986

[54] METHOD OF PREPARING MODIFIED POLYSILOXANE CONTAINING POLYMERS

[75] Inventors: Robert Edelman, Staten Island, N.Y.; William R. Collins, North Brunswick, N.J.

[73] Assignee: M&T Chemicals Inc., Woodbridge, N.J.

[21] Appl. No.: 707,723

[22] Filed: Mar. 1, 1985

[51] Int. Cl.$^4$ .............................................. B05D 5/12
[52] U.S. Cl. ...................................... 427/93; 427/387; 428/447; 525/474; 528/25; 528/26
[58] Field of Search ................... 525/474; 528/25, 26; 427/387, 93; 428/447

[56] References Cited

U.S. PATENT DOCUMENTS

| | | | |
|---|---|---|---|
| 3,445,419 | 5/1969 | Vanderlinde | 528/24 |
| 4,242,487 | 12/1980 | Yajima et al. | 528/25 |
| 4,480,009 | 10/1984 | Berger | 528/23 |

*Primary Examiner*—Melvyn I. Marquis
*Attorney, Agent, or Firm*—S. H. Parker; J. Matalon; R. Bright

[57] ABSTRACT

A method of modifying the properties of siloxane-containing polymers is provided which comprises heating said siloxane-containing polymer in the presence of an organic alcohol, a phenol or a thiol which contains at least two reactive hydrogen-containing groups.

41 Claims, No Drawings

METHOD OF PREPARING MODIFIED POLYSILOXANE CONTAINING POLYMERS

FIELD OF THE INVENTION

This invention relates to polymeric compositions containing a polysiloxane unit and, more particularly, to a method of modifying the properties of siloxane-containing polymers and to the products produced thereby.

BACKGROUND OF THE INVENTION

Attempts have been made over the years to modify the properties of various polymers by the incorporation of a polysiloxane. Heretofore, these polysiloxanes have typically been alpha-omega-bis(alkylene)polysiloxanes and a series of patents disclose the preparation of amides, amide-imides, and imides containing such units. As a general proposition, polymers such as polyimides containing siloxane units as disclosed, for example, in U.S. Pat. Nos. 3,740,305 and 4,030,948 are insoluble in virtually all the common organic solvents and are thermoset or intractable in nature. However, it is suggested in U.S. Pat. No. 3,847,867 that thermoplastic, soluble polyimides containing such polysiloxanes may be prepared.

Recently, as disclosed, for example, in U.S. Pat. No. 4,395,527 it has been found that the properties of a variety of polymers can be improved by the presence of a siloxane unit of formula

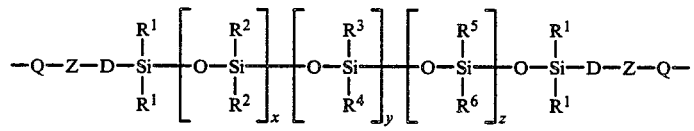

wherein Q is a substituted or unsubstituted aromatic group;

Z is

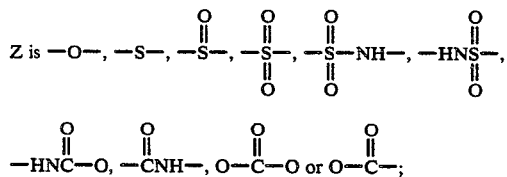

D is substituted or unsubstituted hydrocarbylene:
$R^1$, $R^2$, $R^3$, $R^4$, $R^5$ and $R^6$ each independently is substituted or unsubstituted hydrocarbyl;
x, y and z each independently has a value from 0 to 100;
and that polymers such as polyimides and poly(amide-imides) containing these units are generally thermoplastic and soluble in conventional solvents.

While both thermoset and thermoplastic type polymers containing polysiloxane units have been prepared, there is a great deal of interest in polymers such as polyimides, poly(amide-imides) and the like which are thermoplastic in nature and can be fabricated by conventional molding techniques or are soluble and can be used as coatings, adhesives and the like. In addition to being soluble and/or thermoplastic, it would be highly desirable if the properties of such polymers could be modified to meet specific needs without substantial loss of the desirable mechanical, electrical, thermal and other qualities of the polymer.

SUMMARY OF THE INVENTION

In accordance with the present invention there is provided a method for modifying and/or improving the properties of a siloxane-containing tractable and soluble polymeric material which comprises heating said siloxane-containing polymeric material, preferably to a temperature of from about 150° C. to below the decomposition temperature of said material, in the presence of an organic alcohol, a phenol or a thiol which contains at least two reactive hydrogen-containing groups.

Also provided in accordance with the present invention is a method for improving the properties of a substrate which comprises treating a substrate with a thermoplastic polymer composition containing a thermally stable siloxane unit and heating said treated substrate, preferably to a temperature of from about 150° C. in the presence of an organic alcohol, a phenol or a thiol which contains at least two reactive hydrogen containing groups.

It has been discovered that, in accordance with the practice of the invention, the properties of thermoplastic and soluble siloxane-containing polymers such as polyimides, poly(amide-imides) and the like and substrates treated therewith can be modified and generally improved without detrimental effect thereto. Thus, for example, the properties of a film prepared from a siloxane-containing polyimide in solution form or a substrate treated with a solution of a siloxane-containing polyimide can be modified to provide added solvent resistance.

There is also provided in accordance with the invention a siloxane-containing polymer composition having incorporated therein, preferably in an amount of at least 0.5 mole percent based on the weight of an alcohol, a phenol or a thiol which contains at least two reactive hydrogen containing groups.

DESCRIPTION OF THE INVENTION

In accordance with the present invention the properties of a siloxane-containing polymer can be modified and/or improved by heating said polymer, preferably to a temperature from about 150° C. to below the temperature at which decomposition will occur for at least 30 minutes, in the presence of an organic alcohol, a phenol or a thiol which contains at least two reactive hydrogen containing groups. It has been found that the properties of polysiloxane-containing polymers which are thermoplastic or tractable in nature and/or are soluble in conventional solvents, thus, can be modified and generally improved.

Polysiloxane-containing polymers to which the practice of the invention is applicable include preimidized polyimides containing linear polysiloxane units.

As is known, polyimides are prepared by reacting a dianhydride with a diamine to form polymers comprising recurring structural units of the formula

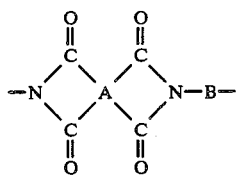

wherein A is a tetravalent residue of a tetracarboxylic acid anhydride, B is the divalent residue of an organic amine and r is an integer greater than 1, and preferably from 10 to 10,000.

As disclosed and illustrated by U.S. Pat. No. 4,395,527, preimidized polyimides containing siloxanes which are thermoplastic or tractable and are soluble in organic solvents have been prepared containing a unit of the formula

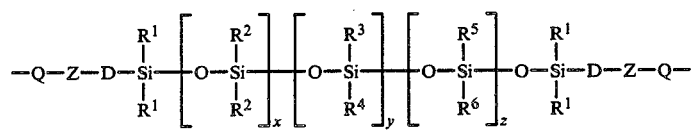

where Q is a substituted or unsubstituted aromatic group;

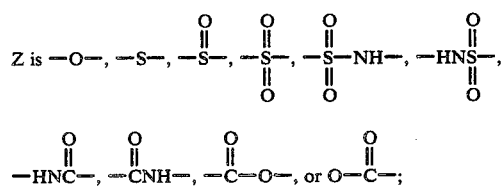

D is unsubstituted or substituted hydrocarbylene;

$R^1$, $R^2$, $R^3$, $R^4$, $R^5$ and $R^6$ each independently are substituted or unsubstituted hydrocarbyl;

x, y and z each independently has a value from 0 to 100.

As disclosed in said patent, siloxane-containing polyimides which are thermoplastic and soluble include the reaction product of an aromatic or aliphatic tetracarboxylic acid anhydride with a bis(functional)polysiloxane of the formula

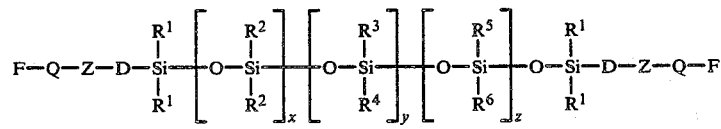

wherein F is a functional group such as $NH_2$ and the various elements are all as previously defined, to provide a polyimide containing a unit or units of formula I.

The dianhydride used in the reaction can be represented by the formula

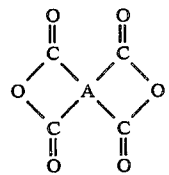

wherein A is the tetravalent residue of a tetracarboxylic acid anhydride. Thus, the polyimide will contain at least one unit of formula I

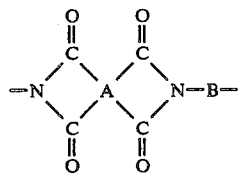

wherein —B— is the unit of formula II which is the residue of a bis(amino)polysiloxane of formula III.

While —B— in formula I can comprise solely the residue of one or more bis-aminopolysiloxanes, as described, it can comprise one or more organic diamines in addition to a bis(amino)polysiloxane. Suitable organic diamines can have the general formula $$H_2N—Y—NH_2$$

wherein Y is a divalent residue that can be aliphatic, including alkylene of 1 to 20 carbon atoms or cycloalkylene of 4 to 8 carbon atoms, or, preferably, the residue of an aromatic diamine. Thus, Y can be phenylene, diphenylene, naphthylene or a group of formula

where $R^7$ is branched or linear alkylene of 1 to 20 carbon atoms,

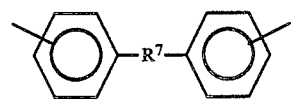

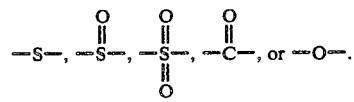

The aryl nuclei can be substituted by lower alkyl, lower alkoxy or other non-interfering groups.

Among the organic diamines that are useful are:
m-phenylenediamine;
p-phenylenediamine;
4,4'-diaminodiphenylpropane;
4,4'-diaminodiphenylmethane (hereinafter referred to as "methylenedianiline");
benzidine;
4,4'-diaminodiphenyl sulfide;
4,4'-diaminodiphenyl sulfone;

4,4'-diaminodiphenyl ether;
1,5-diaminonaphthalene;
3,3'-dimethylbenzidine;
3,3'-dimethoxybenzidine;
2,4-bis(β-amino-t-butyl)toluene;
bis(p-β-amino-t-butyl)phenyl ether;
bis(p-β-methyl-o-aminopentyl)benzene;
1,3-diamino-4-isopropylbenzene;
1,2-bis(3-aminopropoxy)ethane;
m-xylylenediamine;
p-xylylenediamine;
bis(4-aminocyclohexyl)methane;
decamethylenediamine;
3-methylheptamethylenediamine;
4,4'-dimethylheptamethylenediamine;
2,11-dodecanediamine;
2,2-dimethylpropylenediamine;
octamethylenediamine;
3-methoxyhexamethylenediamine;
2,5-dimethylhexamethylenediamine;
2,5-dimethylheptamethylenediamine;
3-methylheptamethylenediamine;
5-methylnonamethylenediamine;
1,4-cyclohexanediamine;
1,12-octadecanediamine;
bis(3-aminopropyl)sulfide;
N-methyl-bis-(3-aminopropyl)amine;
hexamethylenediamine;
heptamethylenediamine;
nonamethylenediamine; and mixtures thereof.

$R^7$ can also be the group of formula —O—G'—O— where G' is phenylene or a group of formula

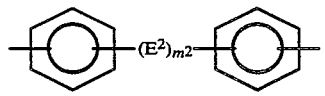

where $m^2$ is 0 or 1 and $E^2$ is

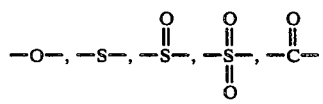

or linear or branched alkylene of 1 to 8 carbon atoms.

Aromatic nucleus Y can be mono-carbocyclic aromatic or polycarbocyclic aromatic of 6 to 14 carbon atoms such as benzene, naphthalene, anthracene, etc. These nuclei can be further substituted by non-interfering groups, such as lower alkyl.

The nucleus Y can also be heterocyclic aromatic of 6 to 20 carbon atoms while the heteroatoms are one or more of N, O and S, such as pyridine, pyrimidine, pyrazine, oxadiazine, oxathiazine, triazine, benzofuran, thionaphthene, indole, quinoline, benzoxazole, benzothiophene and carbazole.

Specific compounds include:
2,4-diamino-chlorobenzene;
2,4-diaminothiophenol;
2,4-diaminophenol;
3,5-diaminobenzoic acid;
methyl-2,4-diaminobenzoate;
2,4-diaminoacetamide;
1-(para-carbomethoxyphenoxy)-2,4-diaminobenzene;
p-(2,4-diaminophenoxy)acetanilide;
3-mercapto-4-amino-4-aminobiphenyl;
1(2'-cyanophenyl)-2,5-diaminonaphthalene.

As disclosed and illustrated by U.S. Pat. No. 4,395,527, in the dianhydride of general formula

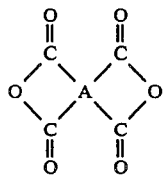

A is a tetravalent radical selected from substituted and unsubstituted aliphatic, cycloaliphatic, heterocyclic, aromatic groups and combinations thereof. Thus, A can be a tetravalent benzene or naphthalene nucleus or a tetravalent group of formula

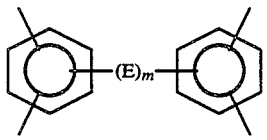

where m is 0 or 1 and E is

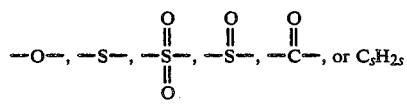

where s is an integer from 1 to 8.

A can also be a tetravalent residue of formula

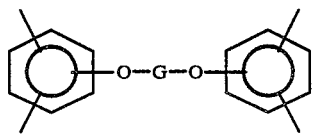

where G is phenylene or a group of formula

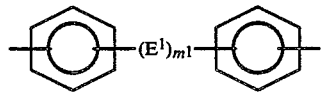

where $m^1$ is 0 or 1 and $E^1$ is selected from the same group as E.

The anhydride can also be aliphatic in nature, such as cyclopentane, tetracarboxylic acid dianhydride, cyclohexane tetracarboxylic acid dianhydride and butane tetracarboxylic acid dianhydride.

Representative specific anhydrides include:
pyromellitic dianhydride;
3,3',4,4'-benzophenone tetracarboxylic dianhydride;
2,2',3,3'-benzophenone tetracarboxylic dianhydride;
3,3',4,4'-diphenyl tetracarboxylic dianhydride;
2,2',3,3'-diphenyl tetracarboxylic dianhydride;
2,2-bis-(3,4-dicarboxyphenyl)propane dianhydride;
2,2-bis-(2,3-dicarboxyphenyl)propane dianhydride;
bis-(3,4-dicarboxyphenyl)ether dianhydride;
bis-(3,4-dicarboxyphenyl)sulfone dianhydride;
bis-(3,4-dicarboxyphenyl)sulfide dianhydride;
1,1-bis-(2,3-dicarboxyphenyl)ethane dianhydride;

1,1-bis-(3,4-dicarboxyphenyl)ethane dianhydride;
bis-(2,3-dicarboxyphenyl)methane dianhydride;
bis-(3,4-dicarboxyphenyl)methane dianhydride;
2,3,6,7-naphthalene tetracarboxylic dianhydride;
1,2,4,5-naphthalene tetracarboxylic dianhydride;
1,2,5,6-naphthalene tetracarboxylic dianhydride;
benzene-1,2,3,4-tetracarboxylic dianhydride;
perylene-3,4,9,10-tetracarboxylic dianhydride;
pyrazine-2,3,5,6-tetracarboxylic dianhydride;
thiophene-2,3,4,5-tetracarboxylic dianhydride;
naphthalene-1,4,5,8-tetracarboxylic dianhydride;
decahydronaphthalene-1,4,5,8-tetracarboxylic dianhydride;
4,8-dimethyl-1,2,3,5,6,7-hexahydronaphthalene-1,2,5,6-tetracarboxylic dianhydride;
2,6-dichloronaphthalene-1,4,5,8-tetracarboxylic dianhydride;
2,7-dichloronaphthalene-1,4,5,8-tetracarboxylic dianhydride;
2,3,6,7-tetrachloronaphthalene-1,4,5,8-tetracarboxylic dianhydride;
phenanthrene-1,8,9,10-tetracarboxylic dianhydride;
cyclopentane-1,2,3,4-tetracarboxylic dianhydride;
pyrrolidine-2,3,4,5-tetracarboxylic dianhydride;
pyrazine-2,3,5,6-tetracarboxylic dianhydride;
1,2,3,4-butane tetracarboxylic dianhydride;
azobenzene tetracarboxylic dianhydride;
2,3,4,5-tetrahydrofuran dianhydride;
p-phenylenebis(trimellitate) anhydride;
1,2-ethylenebis(trimellitate) anhydride;
2,2-propanebis(p-phenylene trimellitate) anhydride;
4,4'-[p-phenylenebis(phenylimino)carbonyldiphthalic-]anhydride;
2,2-bis[4,4'-di(3,4-dicarboxyphenoxy)phenyl]propane dianhydride;
p-bis(3,4-dicarboxyphenoxy)phenyl dianhydride;
4,4'-bis(3,4-dicarboxyphenoxy)diphenyl dianhydride;
bis-[4,4'-di(3,4-dicarboxyphenoxy)phenyl]sulfone dianhydride;
bis[4,4'-di(3,4-dicarboxyphenoxy)phenyl]sulfide dianhydride;

Also applicable for use in accordance with the invention are polysiloxane-containing polyimides such as disclosed, for example, in U.S. Pat. No. 3,847,867. There is disclosed in such patent, polyetherimides of the general formula I wherein A is a unit of the formula

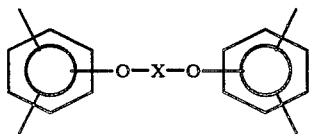

wherein X is a divalent aromatic radical selected from particular classes of substituted phenyls, substituted biphenyls and bridged phenyl groups; and B is the divalent residue of an organic diamine which includes $C_{(3-8)}$ alkylene terminated polydiorganosiloxane, such as derived from a di(aminoalkyl)polysiloxane of the general formula

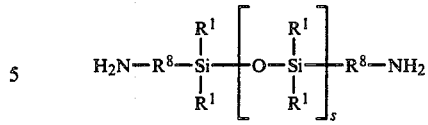

where $R^1$ is as hereinabove defined, $R^8$ is a divalent hydrocarbon, and s is 0 or a whole number of at least 1.

Also applicable for use in accordance with the practice of the present invention are poly(amide-imide) compositions containing linear polysiloxane units such disclosed and illustrated by U.S. Pat. No. 4,395,527.

As is known, poly(amide-imides) are the reaction product of an organic diamine with a tricarboxylic acid anhydride to form polymers comprising structural units of formula IV

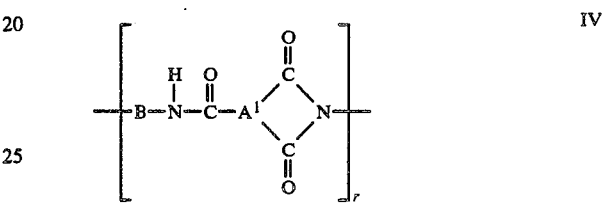

wherein $A^1$ is a trivalent organic radical of a tricarboxylic acid anhydride;
B is a divalent residue as hereinabove defined; and r is an integer greater than 1, and preferably from 10 to 10,000.

Exemplary tricarboxylic acid anhydrides which will react with organic diamines to form suitable poly(amide-imide) compositions include such compounds as:
trimellitic anhydride;
2,6,7-naphthalene tricarboxylic anhydride;
3,3',4-diphenyl tricarboxylic anhydride;
3,3',4-benzophenone tricarboxylic anhydride;
1,3,4-cyclopentane tetracarboxylic anhydride;
2,2',3-diphenyl tricarboxylic anhydride;
diphenyl sulfone-3,3',4-tricarboxylic anhydride;
diphenyl isopropylidene-3,3',4-tricarboxylic anhydride;
3,4,10-propylene tricarboxylic anhydride;
3,4-dicarboxyphenyl-3-carboxyphenylether anhydride;
ethylene tricarboxylic anhydride; etc.

Also useful are the corresponding acids of such anhydride and the triacid anhydride analogues of the diether-containing anhydrides described above in connection with the polyimides.

Part or all of the diamine reactant which can be used to form suitable poly(amide-imide) compositions can be a bis(amino-siloxane) of formula III or a di(aminoalkyl)-polysiloxane of the general formula

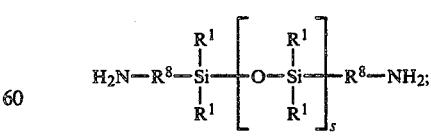

wherein $R^1$, $R^8$ and s are as hereinabove defined; and part of the anhydride reactant can be replaced by a siloxane-containing triacid anhydride.

Other polysiloxane-containing polymers applicable for use in accordance with the invention include polysiloxane-containing polyamide, polyphenylene sulfide, polyepoxide, polyphenolic, polycarbonate, polyester, poly-urethane and polysulfone.

As indicated, in accordance with the present invention the properties of polysiloxane-containing thermoplastic polymers, as herein described, can be modified and/or improved by heating said polymer in the presence of an organic alcohol, a phenol or a thiol which contains at least two reactive hydrogen groups. Generally, the process of the invention can be advantageously carried out by heating said polymer to a temperature of from about 150° C. to below the decomposition temperature of said siloxane-containing polymer, and preferably below about 300° C.

Suitable organic alcohols, phenols and thiols for use in accordance with the practice of the invention can be aliphatic and aromatic alcohols, phenols or thiols which contain at least two reactive hydrogen groups. In general, said alcohol, phenol or thiol component should be relatively non-volatile at temperatures up to at least about 150° C., should be at least partially compatible with, and preferably, soluble or dispersible in the siloxane-containing polymer and should be generally inert in the presence of said polymer at ambient conditions and not cause any significant degradation thereof at elevated temperatures.

Organic alcohols that are suitable for use are aliphatic and aromatic alcohols or mixtures thereof having at least two reactive hydrogen containing groups which are preferably primary hydroxyl groups. Suitable aliphatic alcohols include polyhydric alcohols which contain 2 to 20 carbon atoms and 2 to 6 hydroxyl groups such as, for example, ethylene glycol, propylene glycol, diethylene glycol, butane-1,4-diol, pentane-1,5,-diol, hexane-1,3-diol, hexane-1,6-diol, glycerol and the like. Preferred are alcohols, which contain at least three hydroxyl groups such as, for example, 1,1,1-trimethylolpropane, 1,1,1-trimethylolethane, hexane-1,2,6-triol, 1,3,5-trihydroxymethylbenzene, pentaerythritol, and N,N,N',N'-tetrakis-(2-hydroxypropyl)ethylenediamine.

Suitable phenols can have one or more carbocyclic aromatic rings in which a total of from two to five hydroxyl groups are bonded directly to one or more aromatic rings. Exemplary of such suitable compounds are:
resorcinol;
hydroquinone;
2,2-bis(4,4'-hydroxyphenyl)propane.

Organic thiols which are suitable for use in accordance with the invention include mercaptan-containing organic compounds or mixtures of organic compounds such as hydrocarbyl mercaptans, mercapto esters and mercapto alcohols which contain a total of from two to five mercapto (—SH) groups or from two to five mercapto (—SH) and hydroxyl groups which can be illustrated by one of the following formulae $$HS-CH(CH_2)_gR^{11}$$
$$\quad\quad R^{12} \quad R^{14}$$

$$\begin{array}{c} SH \\ | \\ (CH_2)_g-R^{12}; \\ | \\ R^{10}-R_h^{11} \\ / \\ R^{19} \end{array}$$

$$HS-CH(CH_2)_gR^{15}(CH_2)_gCH-SH;$$
$$\quad R^{12}\ R^{12}\quad\quad R^{12}\ R^{12}$$

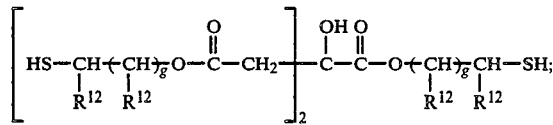

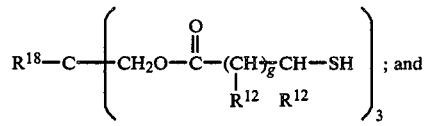

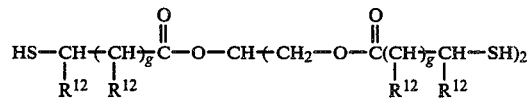

wherein
$R^{10}$ is cycloalkyl, cycloalkenyl or phenyl;
$R^{11}$ is —OH or —SH;
$R^{12}$ is H, aryl or $C_1$ to $C_{18}$ alkyl;
$R^{14}$ is —OH, —SH, aryl, $C_1$ to $C_{18}$ alkyl;

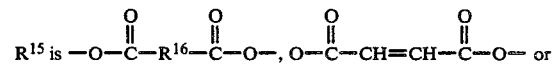

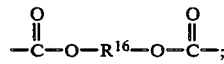

$R^{16}$ is arylene, $C_1$ to $C_8$ alkylene or

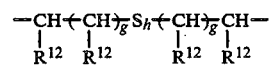

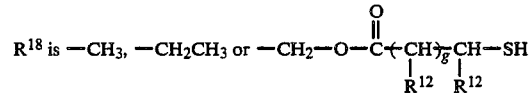

$R^{19}$ is —H or a divalent group which may contain halogen, hydroxy, mercapto or alkyl substitutents and which combines with $R^{10}$ when $R^{10}$ is phenyl to form a naphthalene ring;
g is 0 or an integer from 1 to 6;
h is 0, 1, 2 or 3.

Exemplary mercaptan-containing organic compounds include, but are not limited to the following:

HSCH₂CH₂OH;
HSCH₂CH₂CH₂OH;

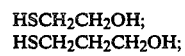

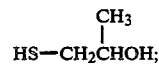

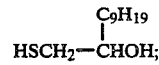

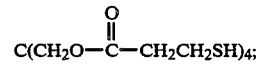

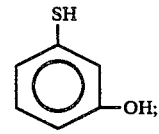

-continued

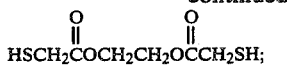

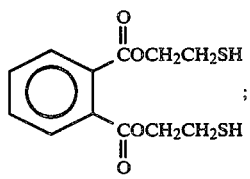

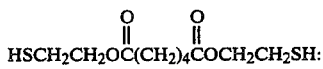

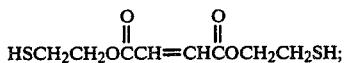

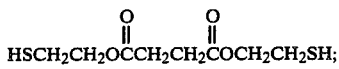

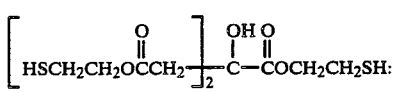

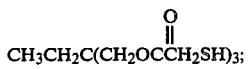

Incorporation of suitable polyfunctional alcohols, phenols and thiols in a polysiloxane-containing polymer after the polymer has been prepared is an advantageous method of providing said additive for carrying out the process of the invention. For example, when it is desired to modify the properties of a preimidized polyimide which has been prepared by any of the known solvent or melt polymerization techniques, the alcohol, phenol and/or thiol additive may be incorporated into the polymer at any time prior to the use thereof. Generally, the additive could be advantageously admixed with the polymer in a manner that would conveniently coordinate with the fabrication technique to be employed. Thus, for example, when a solution or paste composition of polymer is used as for coating or adhesive applications, a compatible solution or paste of said additive would be prepared and then incorporated into the polymer-containing solution or paste. Compatible pastes or solutions of the additive could also be used for incorporating the additive into the polymer during the extrusion and injection or compression molding thereof.

It should be understood, however, that the alcohol, phenol and thiol additives suitable for use in the present invention are generally latent in the polymer at ambient conditions and, thus, can be incorporated therein in generally any convenient form ("neat" 100% active, solution, paste, masterbatch, etc.) at essentially any time subsequent to the preparation thereof.

The amount of alcohol, phenol or thiol additive used in accordance with the practice of the invention can vary over a wide range and will depend on several factors, including, but not limited to, the particular siloxane-containing polymer, the temperature to which the polymer can be subjected and the application for which it is intended. In general, while the amount of said additive that should be used is not critical, it would be advantageous to use at least about 0.5 mole percent, and preferably, at least about 1 mole percent of said additive based on the weight of the polymer. There is no critical upper limit to the amount of the alcohol, phenol or thiol as herein described that can be present in the polymer composition but an amount excess of about 75 mole percent based on the weight of polymer does not give desired changes of properties of the polymer that are commensurate with the amount of additive employed.

It will be readily apparent that the time needed to heat the siloxane-containing polymers to achieve modification or improvement of the properties thereof in accordance with the practice of the invention will depend on several factors including the particular siloxane-containing polymer, the amount and type of alcohol, phenol or thiol additive that is used and the temperature that can be used. In general, heating of the siloxane-containing polymer in the presence of the alcohol, phenol or thiol herein described for at least 30 minutes at a temperature of about 150° C. or higher can result in the modification of the properties of a siloxane-containing polymer such as a polyimide and heating the polymer at about 150° C. or higher for two or more hours may be needed to achieve a desired amount of modification.

As is known, the properties of siloxane containing polymers such as polyimides, poly(amide-imides) and the like can be varied over a very broad range, generally at will, depending on the particular combination of reactants that are chosen. For example, as pointed out in U.S. Pat. No. 4,395,527 the polysiloxanes of formula III can be incorporated into a variety of polymeric compositions to modify the properties thereof. Among the more significant properties contributed by these polysiloxane units is their surprising heat resistance, but the polysiloxanes are also shown to impart flexibility, elongation and impact resistance; improved resistance to corrosion; improved electrical properties; lower glass transition temperatures, etc.

In this connection, as herein described, polyimides prepared by the reaction of a dianhydride with a diamine form polymers comprising units of formula I. "A" is the residue of a dianhydride component which can be a single compound or the combination with one or more other anhydrides and include embodiments which can be di-ether containing and/or contain a siloxane group. "B" is the residue of a diamine component which can comprise solely one or more bis-aminopolysiloxanes, as described, or it can comprise one or more organic diamines, preferably aromatic diamines, in addition to a bis-aminopolysiloxane. The polyimide obtained from a bis-aminosiloxane of formula III and a dianhydride, whether diether containing or not, is thermoplastic and soluble in a variety of conventional solvents. In addition to being soluble, these polyimides exhibit excellent heat stability, are resistant to high energy radiation, display tenacious adhesion to a variety of substrates, including glass, ceramic, metals, copper, stainless steel, etc. and all manner of plastics.

Solubility of the resulting polyimide will be affected by the nature of the dianhydride, the concentrations of the siloxane in the polymer and the value of x, y and z in the formula. For example, a diether-containing anhydride will yield a polyimide soluble over all combinations of siloxane and organic diamine. Not only is the resulting polyimide soluble in various chlorinated hydrocarbon solvents and polar solvents but, the polyimide is also soluble in a solvent which is derived from monoalkyl and/or dialkyl ethers of ethylene glycol and condensed polyethylene glycols and/or cyclic ethers containing no less than a 5 member ring, such as diglyme (diethylene glycol dimethyl ether) at standard temperature and pressure.

Polyimides derived from a non-diether containing anhydride and a disiloxane have limited solubility in diglyme but are more soluble in the polar solvents such as N-methyl-2-pyrrolidone and in phenolic liquids, such as cresylic acid (methyl phenol). Solubility increases, however, when a polysiloxane is present in the polyimide. For example, the polyimide derived from benzophenone tetracarboxylic dianhydride and the bis-(aminophenoxybutyl) polysiloxane where $R^2$ is methyl, x is 6 and y and z are 0 in the formula III hereof, is soluble in warm diglyme to provide a 25% by weight solution. The solubility of the polyimide increases considerably when the siloxane content is above 40 mole percent; as indicated one can prepare solutions wherein the polyimide has included 100 mole percent siloxane.

It may be concluded that the silicone in the polyimide tends to solubilize the system. That is, the siloxane tends to make the polyimides soluble in a greater class of solvents. The greater the siloxane content of the polyimide, the more soluble it becomes in a given solvent.

Solubility in a solvent such as those derived from monoalkyl and/or dialkyl ethers of ethylene glycols and condensed polyethylene glycols and/or cyclic ethers containing no less than a 5 member ring such as diglyme has an advantage over the other solvents previously employed. Solutions of polyimides can be applied to a substrate and thereafter dried to form a tough polyimide coating by solvent evaporation at temperatures significantly below those generally required for the polar solvents. Thus, one can provide polyimide coatings by evaporating at temperatures below 150° C. and even below 100° C. For example, a polyimide obtained from 2,2-[4,4'-di(3,4-dicarboxyphenoxy)phenyl]propane dianhydride, m-phenylene dianiline and containing 40 mole percent of bis-aminophenoxybutyl tetramethyl disiloxane, dissolved in diglyme to provide a 25% solids solution can be applied as a coating to a substrate and dried by solvent evaporation at from about 75° C. to about 95° C. in from 20 to 30 minutes to provide a dry coating from 1 to 2 millimeters thick. The solids content can be varied according to mode of application (dipping, spraying, painting, spinning, etc.) and final use. Repeated applications can be made to obtain a desired thickness.

While it has been indicated, for example, that in connection with the polysiloxanes (i.e., where $R^2$ is methyl and x is large, for example, 10 to 100 or more) solubility of the polyimide is increased, in accordance with the present invention it is possible to increase the solvent resistance of the coating after application thereof by having incorporated in the coating solution an alcohol, phenol or thiol as herein described, and then heating the coating at 150° C. to 210° C. until the desired solvent resistance is obtained, i.e. from 30 minutes to 2 hours or longer. An alcohol such as pentaerythritol or a thiol such as tetra(3-mercaptopropionate) added in an amount from about 1% to 5% by weight may be advantageously employed in this application.

Further, in connection with the polysiloxane containing polyimides, the properties of the polymer such as tensile strength, $Tg_1$, hardness flexibility, low temperature servicability and the like may be varied by using different combinations if dianhydride and diamine components. However, when variation of a desired property is not conveniently accomplished without affecting the molding or process characteristics of the polymer, such modification may be made possible by the method of the present invention.

In addition to adjusting the reactants, one can also modify the properties of siloxane-containing polymers such as polyimides by blending different polyimides. Thus, for example, different siloxane-containing polyimides or poly(amide-imides) can be mixed and blended to provide desired properties. Generally siloxane-containing polyimides cannot easily be blended with non-silicone containing polyimides due to poor compatibility.

Polymers such as, for example, polyimides and poly(amide-imides) containing the siloxane unit have been found particularly suitable for use in a number of electronic applications such as wire enamels, as conformal, protective, junction and passivation coatings for electrical devices, printed circuit boards and semiconductor devices. They are suitable for use with electric devices since they have several desirable physical characteristics. The polymer is one which can easily be applied and dried in place and will not degrade, and enhances the electrical characteristics of the device to which it is applied. It adheres very tenaciously to the surface to which it is applied to prevent migration of ions on the surface of the device. When employed with semiconductor devices, it does not release any materials during drying cycles which are deleterious to the operating characteristics of the device. The polymer exhibits good abrasion resistance to protect the surfaces to which the coating is applied.

The soluble polymers are also capable of being applied in multiple layers to provide a thick coating when required and are able to bond well to itself as well as to many metallic and non-metallic substrates.

However, when a polyimide is not capable of inherently exhibiting all of the desired characteristics to the degree necessary, in accordance with the present invention it is capable of being modified to achieve a desired end result. Ease of application to the surface to be protected and reasonably short drying times are still retained. This is of particular interest when the coating material is employed in the manufacture of mass produced electronic devices. By means of the process of the invention, the polymer coating becomes, for example, generally insoluble or less solvent-sensitive under functional conditions.

The thermoplastic siloxane containing polymers such as polyimides, poly(amide-imides) and the like are processible by compression molding, film casting and solution fiber spinning techniques. Because of their high elongation and toughness, they are particularly useful in thin-film products—films, enamels, adhesives, coatings and fibers They can be molded and parts molded from these polymers retain strength at 300° C. and as high as 500° C. for short periods, for example, during processing graphite and glass-fiber laminates and hot-drawing of fibers. Laminates, films and coatings display a minimum of voids or imperfections because no reaction products are formed at processing temperatures.

Laminates are made in high-pressure platen presses, low-pressure vacuum bags or moderate pressure vacuum autoclave bags. Solutions can be used as laminating varnish to impregnate glass, graphite or quartz cloth, or glass, boron, graphite or aramid fibers to produce laminates with flame-resistance, high-temperature strength and good electrical properties having utility in radomes, printed circuit boards, radioactive waste containers and turbine blades and structural parts close to the hot engine environment.

Generally, all of these advantages of the siloxane-containing polymers such as polyimides, poly(amide-imides) and the like that have been found will be retained. By means of the practice of the present invention, the polymer becomes less fusible and much less soluble under conditions at which the product may be processed or used. As a result, the resin retains good strength and adhesion characteristics but is less solvent-sensitive or fusible under functional conditions.

The following illustrates the practice of this invention. One can employ the procedures described in U.S. Pat. No. 4,395,527 to prepare polyimide polymers having the following compositions:

Polyimide 1: 3,3',4,4'-benzophenone tetracarboxylic acid dianhydride and a mixture of diamines containing 70 mole % 4,4'-methylenedianiline and 30 mole % bis-gamma aminopropyltetramethyldisiloxane.

Polyimide 2: 3,3'-4,4'-benzophenone tetracarboxylic acid dianhydride and a mixture of diamines containing 80 mole % bis[4-(p-aminophenoxy)phenyl]sulfone and 20 mole % bis-gamma aminopropyltetramethyldisiloxane.

Polyimide 3: 4,4'-bis(3,4-dicarboxyphenoxy)diphenyl sulfone dianhydride and a mixture of diamines containing 40 mole % m-phenylenediamine and 60 mole % bis (m-aminophenoxybutyl)hexadecamethyloctasiloxane.

Polyimide 4: 2,2-bis(3,4-dicarboxyphenyl)propane dianhydride and a mixture of diamines containing 85 mole % 4,4'-methylenedianiline and 15 mole % bis(m-aminophenoxybutyl)hexadecamethyloctasiloxane.

Polyimide 5: 2,2-bis(3,4-dicarboxyphenyl)propane dianhydride and a mixture of diamines containing 65 mole % bis(4,4'-diaminodiphenyl)ether and 35 mole % bis-gamma aminopropyltetramethyldisiloxane.

Each polyimide is treated in the following manner: A polyimide solution, 10-30% by weight in N-methylpyrrolidone (NMP) is prepared. Four samples of the polyimide solution weighing ten grams each were made up. To three of the samples, in progressively larger quantity is added pentaerythritol tetra-(3-mercaptopropionate) (PTMP) dissolved in NMP such that the PTMP comprises 0.1-2.0 percent by weight of the total solids in each of the samples. The fourth sample is used as a control and contains no PTMP. All four solutions are made into films by use of a Doctor blade on a glass surface previously treated with a fluorocarbon release agent. The films are baked in steps at 60° C./one hour, 150° C./one hour plus two-three hours at 150°-210° C.

The films are removed from the glass and subjected to a Soxhlet extraction with chloroform for 24 hours. At the completion of this period any film remaining undissolved is removed and dried in a vacuum oven for 24 hours at 90° C. The weight of the film remaining after Soxhlet extraction and drying is compared to the weight of the film prior to the Soxhlet extraction. In all cases the control film containing no additive is completely dissolved by the Soxhlet procedure. Significant portions of the three films containing the additive remain undissolved.

What is claimed is:

1. A method of modifying the properties of a siloxane-containing polyimide or poly(amide-imide) which comprises heating said siloxane-containing polyimide or poly(amide-imide) in the presence of an organic alcohol, a phenol or a thiol which contain at least two reactive hydrogen-containing groups.

2. The method according to claim 1 in which said siloxane-containing polyimide or poly(amide-imide) is a thermoplastic and/or soluble polyimide or poly(amide-imide).

3. The method according to claim 1 in which said polyimide of poly(amide-imide) is heated to a temperature of at least about 150° C.

4. The method according to claim 1 in which said siloxane-containing polyimide or poly(amide-imide) contains a siloxane unit of formula

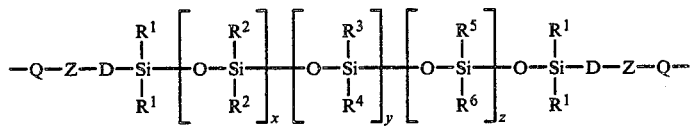

where
Q is a substituted or unsubstituted aromatic group
Z is

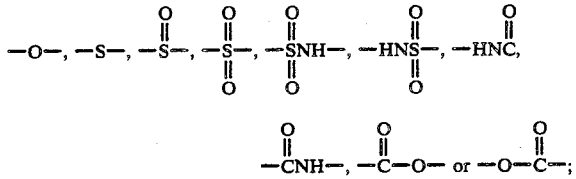

D is unsubstituted or substituted hydrocarbylene;
$R^1$, $R^2$, $R^3$, $R^4$, $R^5$ and $R^6$ each independently is unsubstituted or substituted hydrocarbyl;
x, y and z each independently has a value from 0 to 100.

5. The method according to claim 4 in which
Q is substituted or unsubstituted carbocyclic aromatic of 6 to 18 ring carbon atoms or substituted or unsubstituted heterocyclic aromatic of 5 to 18 ring atoms where the hetero atoms are selected from N, O and S, and where the substituents are alkyl of 1 to 12 carbon atoms, alkenyl of 2 to 12 carbon atoms, alkynyl of 2 to 12 carbon atoms, cycloalkyl of 4 to 8 carbon atoms, alkoxy of 1 to 12 carbon atoms, alkylthio of 1 to 12 carbon atoms, phenyl, alkylphenylene having 1 to 12 carbon atoms in the alkyl group, phenoxy, phenylthio, alkylcarbonyloxy of 2 to 12 carbon atoms, phenylalkylene of 1 to 12 carbon atoms in the alkylene group, alkylcarbonyl of 2 to 12 carbon atoms, alkoxycarbonyl of 2 to 12 carbon atoms, bromo, chloro, fluoro, iodo, nitro, cyano, cyanothio, carboxy, carbonyl, hydroxy, mercapto, formyl, thioformyl or mercaptocarbonyl;

D is substituted or unsubstituted hydrocarbylene of 1 or 3 to 18 carbon atoms;

$R^1$, $R^2$, $R^3$, $R^4$, $R^5$ and $R^6$ each independently, is an unsubstituted or substituted alkyl of 1 to 12 carbon atoms, alkenyl of 2 to 12 carbon atoms, alkynyl of 2 to 12 carbon atoms, cycloalkyl of 4 to 8 carbon atoms, phenyl, alkylphenylene where the alkyl group contains 1 to 12 carbon atoms, phenylalkylene where the alkylene group contains 1 to 12 carbon atoms, or alkenylphenylene with 2 to 12 carbon atoms in the alkenyl group and when substituted, these hydrocarbyl groups are substituted by Br, Cl, I, F, —NC, —NO₂, —OCN, alkoxy of 1 to 8 carbon atoms, —S—(C₁-C₈)alkyl,

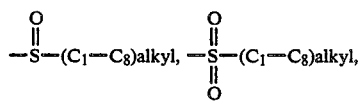

—S—S—(C₁-C₈)alkyl, —COOH, —COSH, —CSOH, —CONH₂, —CN, —CHO, —CHS, —OH, —SH, —NCO or —NR₇R₈ where $R_7$ and $R_8$ independently are hydrogen or lower alkyl.

6. The method according to claim 5 in which
Q is unsubstituted or substituted carbocyclic aromatic of 6 to 18 ring carbon atoms;
D is branched or linear alkylene of 1 or 3 to 12 carbon atoms; and
x, y and z is each 0.

7. The method according to claim 6 which the siloxane unit has the formula

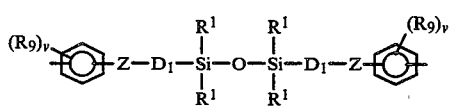

where
v is 0 to 4
$R_9$ is each independently lower alkyl, lower alkenyl, lower alkynyl, cycloalkyl of 4 to 8 carbon atoms, lower alkoxy, lower alkylthio, phenyl, loweralkylphenylene, phenyl loweralkylene, loweralkenylphenylene, phenoxy, phenylthio, loweralkylcarbonyl, loweralkylcarbonyloxy, loweralkoxycarbonyl, bromo, chloro, fluoro, iodo, nitro, cyano, cyanothio, carboxyl, carbonyl, hydroxyl, mercapto or mercaptocarbonyl;

Z is

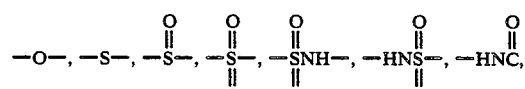

-continued

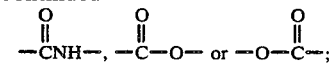

$D_1$ is methylene or alkylene of 3 to 8 carbon atoms;
$R^1$ is lower alkyl, lower alkenyl, lower alkynyl, phenyl, loweralkylphenylene, phenylloweralkylene, or loweralkenylphenylene.

8. The method according to claim 7 in which
v is 0 or 1 and
$R^1$ is lower alkyl.

9. The method according to claim 7 in which
v is 0 or 1;
Z is —O—;
$R^1$ is lower alkyl.

10. The method according to claim 7 in which
v is 0 or 1;
Z is —O—;
$D_1$ is methylene, propylene or butylene;
$R^1$ is alkyl of 1 to 3 carbon atoms.

11. The method according to claim 7 in which
v is 0;
Z is —O—;
$D_1$ is methylene or butylene; and
$R^1$ is methyl.

12. The method according to claim 5 in which
Q is unsubstituted or substituted carbocyclic aromatic of 6 to 18 ring carbon atoms;
D is branched or linear alkylene of 1 or 3 to 12 carbon atoms;
x has a value from 0 to 100;
y has a value from 0 to 20;
z has a value from 0 to 20.

13. The method according to claim 4 in which
$R^1$ is unsubstituted hydrocarbyl of 1 to 18 carbon atoms;
$R^2$ is alkyl of 1 to 12 carbon atoms;
$R^3$ is phenyl, alkylphenylene of 7 to 18 carbon atoms, or alkyl of 1 to 12 carbon atoms;
$R^4$ is alkyl of 1 to 12 carbon atoms, phenyl, alkylphenylene of 7 to 18 carbon atoms, or alkenyl of 2 to 12 carbon atoms;
$R^5$ is alkenyl of 2 to 12 carbon atoms, or substituted alkyl of 1 to 12 carbon atoms;
$R^6$ is alkyl of 1 to 12 carbon atoms, phenyl, alkylphenylene of 7 to 18 carbon atoms, or alkenyl of 2 to 12 carbon atoms.

14. The method according to claim 13 in which the siloxane unit has the formula

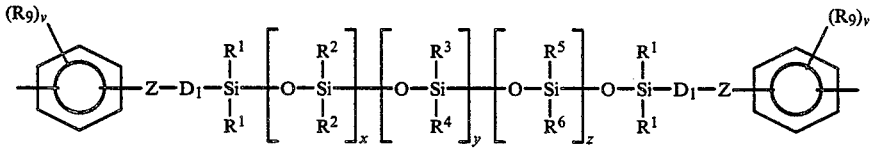

where
v is 0 or 4;
$R_9$ is each independently lower alkyl, lower alkenyl, lower alkynyl, cycloalkyl of 4 to 8 carbon atoms, lower alkoxy, lower alkylthio, phenyl, loweralkylphenylene, phenylloweralkylene, loweralkenylphenylene, phenoxy, phenylthio, loweralkylcarbonyl, loweralkylcarbonyloxy, loweralkoxycarbonyl, bromo, chloro, fluoro, iodo, nitro, cyano, cyanothio, carboxyl, carbonyl, hydroxyl, mercapto or mercaptocarbonyl;

Z is $$-O-, -S-, -\underset{O}{\overset{O}{\underset{\|}{S}}}-, -\underset{O}{\overset{O}{\underset{\|}{S}}}-, -\underset{O}{\overset{O}{\underset{\|}{S}}}NH, -HN\underset{O}{\overset{O}{\underset{\|}{S}}}-, -\overset{O}{\underset{\|}{C}}NH-,$$

$$-HN\overset{O}{\underset{\|}{C}}, -\overset{O}{\underset{\|}{C}}O- \text{ or } -O\overset{O}{\underset{\|}{C}}-;$$

$D_1$ is methylene or alkylene of 3 to 8 carbon atoms.

15. The method according to claim 14 in which
$R^1$ is lower alkyl, lower alkenyl, lower alkynyl, phenyl, lower alkylphenylene, phenyl lower alkylene, or lower alkenylphenylene;
$R^2$ is alkyl of 1 to 12 carbon atoms;
$R^3$ is phenyl, alkyl phenylene of 7 to 18 carbon atoms or alkyl of 1 to 12 carbon atoms;
$R^4$ is alkyl of 1 to 12 carbon atoms, phenyl, alkylphenylene of 7 to 18 carbon atoms, or alkenyl of 2 to 12 carbon atoms;
$R^5$ is alkynyl of 2 to 12 carbon atoms or substituted alkyl of 1 to 12 carbon atoms;
$R^6$ is alkyl of 1 to 12 carbon atoms, phenyl, alkylphenylene of 7 to 18 carbon atoms, or alkenyl of 2 to 12 carbon atoms.

16. The method according to claim 15 in which
v is 0 or 1;
$D_1$ is methylene or alkylene of 3 to 8 carbon atoms;
$R^1$ is lower alkyl;
$R^2$ is lower alkyl;
$R^3$ is lower alkyl or phenyl;
$R^4$ is lower alkyl, phenyl, or lower alkenyl;
$R^5$ is lower alkenyl or substituted lower alkyl;
$R^6$ is lower alkyl or lower alkenyl; the substituents on $R^4$, $R^5$ and $R^6$ lower alkyls being independently selected from halogen, amino, cyano, —CONH$_2$, hydroxyl and mercapto;
x has a value from 0 to 100;
y has a value from 0 to 20; and
z has a value from 0 to 20.

17. The method according to claim 16 in which
v is 0 or 1;
Z is —O— or —S—;
$D_1$ is methylene, propylene or butylene;
$R^1$ is alkyl of 1 to 3 carbon atoms;
$R^2$ is alkyl of 1 to 3 carbon atoms;
$R^3$ is alkyl of 1 to 3 carbon atoms or phenyl;
$R^4$ is alkyl of 1 to 3 carbon atoms, alkenyl of 2 to 4 carbon atoms, phenyl or said alkyl substituted by amino, cyano, hydroxyl or —CONH$_2$;
$R^5$ is alkenyl of 2 to 4 carbon atoms or alkyl of 1 to 3 carbon atoms substituted by amino, cyano, hydroxyl or —CONH$_2$;
$R^6$ is alkyl of 1 to 3 carbon atoms, alkenyl of 2 to 4 carbon atoms or alkyl of 1 to 3 carbon atoms substituted by amino, cyano, hydroxyl or —CONH$_2$;
x has a value from 0 to 100;
y has a value from 0 to 20; and
z has a value from 0 to 20.

18. The method according to claim 13 in which
v is 0;
Z is —O—;
$D_1$ is methylene or butylene;
$R^1$ is methyl;
$R^2$ is methyl;
$R^3$ is methyl or phenyl;
$R^4$ is methyl, vinyl or phenyl;
$R^5$ is vinyl or methyl, ethyl or propyl substituted by amine, cyano, hydroxyl or —CONH$_2$;
$R^6$ is methyl, vinyl or methyl, ethyl or propyl substituted by amino, cyano, hydrogen or —CONH$_2$;
x has a value from 0 to 100;
y has a value from 0 to 20; and
z has a value from 0 to 10.

19. The method according to claim 5 in which
Q is substituted or unsubstituted heterocyclic aromatic of 5 to 18 ring atoms, where the hetero atoms are selected from N, O and S;
D is branched or linear alkylene of 1 or 3 to 12 carbon atoms; and
x, y and z, each, independently, has a value from 0 to 100.

20. The method according to claim 19 in which the heterocyclic nucleus is pyridinyl, pyridazinyl, pyrimidinyl, pyrazinyl, furanyl, thiofuranyl, pyrrollinyl, indenyl, benzofuranyl, benzothiofuranyl, indolinyl, quinolinyl or isoquinolinyl.

21. The method according to claim 1 in which said polyimide or poly(amide-imide) comprises the reaction product of an organic acid, anhydride or acid-anhydride with a bis(amino)polysiloxane of formula $$H_2N-Q-Z-D-\underset{R^1}{\overset{R^1}{\underset{|}{\overset{|}{Si}}}}\left[-O-\underset{R^2}{\overset{R^2}{\underset{|}{\overset{|}{Si}}}}\right]_x\left[-O-\underset{R^4}{\overset{R^3}{\underset{|}{\overset{|}{Si}}}}\right]_y\left[-O-\underset{R^6}{\overset{R^5}{\underset{|}{\overset{|}{Si}}}}\right]_z-O-\underset{R^1}{\overset{R^1}{\underset{|}{\overset{|}{Si}}}}-D-Z-Q-NH_2$$

where
Q is a substituted or unsubstituted aromatic group;
Z is $$-O-, -S-, -\underset{O}{\overset{O}{\underset{\|}{S}}}-, -\underset{O}{\overset{O}{\underset{\|}{S}}}-, -\underset{O}{\overset{O}{\underset{\|}{S}}}NH, -HN\underset{O}{\overset{O}{\underset{\|}{S}}}-, -HN\overset{O}{\underset{\|}{C}}-,$$

$$-\overset{O}{\underset{\|}{C}}NH, -\overset{O}{\underset{\|}{C}}-O- \text{ or } -O-\overset{O}{\underset{\|}{C}}-;$$

D is unsubstituted or substituted hydrocarbylene;
$R^1$, $R^2$, $R^3$, $R^4$, and $R^5$ and $R^6$ each independently is unsubstituted or substituted hydrocarbyl;
x, y and z each independently has a value from 0 to 100.

22. The method according to claim 1 in which said polyimide comprises the reaction product of a dianhydride component with an amine component, the dianhydride component comprising a dianhydride of formula

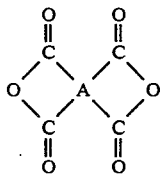

where A is a tetravalent benzene or naphthalene nucleus or a tetravalent group of formula

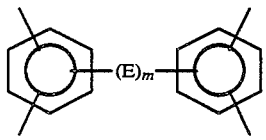

or

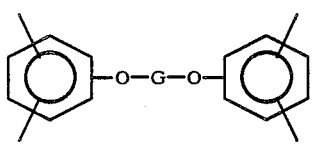

wherein G is phenylene or a group of formula

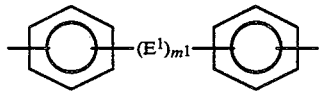

and where m and m¹ is each 0 or 1 and E and E¹ is each

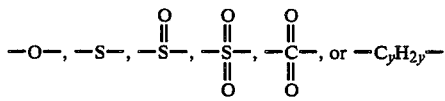

where y is an integer from 1 to 8; the amine component comprising a bis(amino)polysiloxane having the formula

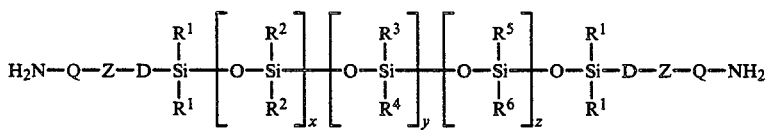

where
Q is a substituted or unsubstituted aromatic group;
Z is

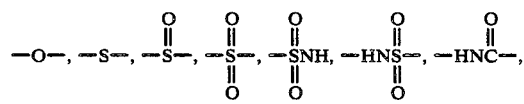

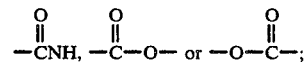

D is substituted or unsubstituted hydrocarbylene of 1 or 3 to 18 carbon atoms;
R¹, R², R³, R⁴, R⁵ and R⁶ each independently is unsubstituted or substituted hydrocarbyl; and
x, y and z, each independently, has a value from 0 to 100.

23. The method according to claim 1 in which said polyimide or poly(amide-imide) contains a siloxane unit which is a $C_{(3-8)}$ alkylene terminated polydiorganosiloxane.

24. The method according to claim 23 in which said siloxane unit is of the formula

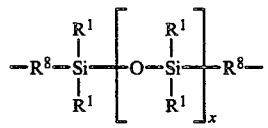

wherein
R¹ is a monovalent hydrocarbon radical;
R² is a divalent hydrocarbon radical; and
s is zero or a whole number of at least 1.

25. The method according to claim 1 in which said reactive hydrogen containing compounds is an organic alcohol or a thiol.

26. The method according to claim 25 in which said reactive hydrogen containing compound contains at least three reactive hydrogen containing groups.

27. A polyimide or poly(amide-imide) which is prepared by the method of claim 1.

28. A polyimide or poly(amide-imide) which is prepared by the method of claim 25.

29. A polyimide or poly(amide-imide) which is prepared by the method of claim 26.

30. A method of improving the properties of a substrate which comprises applying a siloxane-containing polyimide or poly(amide-imide) to a substrate and heating the resultant substrate in the presence of an organic alcohol, a phenol, or a thiol which contains at least two reactive hydrogen-containing groups.

31. The method according to claim 30 in which said siloxane-containing polyimide or poly(amide-imide) contains said alcohol, phenol or thiol incorporated therein.

32. The method according to claim 30 in which said polyimide or poly(amide-imide) contains a siloxane unit of formula

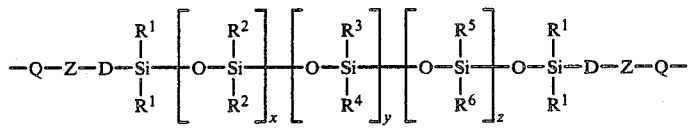

where

Q is a substituted or unsubstituted aromatic group

Z is

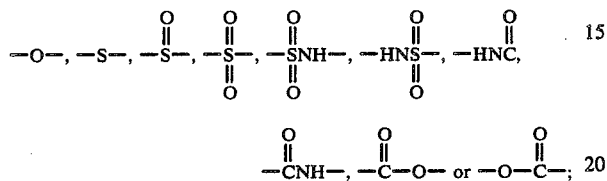

D is unsubstituted or substituted hydrocarbylene;

$R^1$, $R^2$, $R^3$, $R^4$, $R^5$ and $R^6$ each independently is unsubstituted or substituted hydrocarbyl;

x, y and z each independently has a value from 0 to 100.

33. The method according to claim 30 in which said polyimide or poly(amide-imide) contains a siloxane unit which is a $C_{(3-8)}$ alkylene terminated polydiorganosiloxane.

34. The method according to claim 30 in which said polyimide or poly(amide-imide) is dissolved in a solvent.

35. The method according to claim 33 in which said substrate comprises a semiconductor device.

36. The method according to claim 33 in which said substrate comprises conductive wire, or fibers or filaments of carbon, glass, metal, ceramic, polyimide or fabrics woven therefrom.

37. The method according to claim 3 in which said polyimide or poly(amide-imide) is heated for at least about 30 minutes.

38. The method according to claim 30 in which said substrate is heated for at least about 30 minutes.

39. A siloxane containing polyimide or poly(amide-imide) composition containing an organic alcohol, a phenol or a thiol.

40. The composition according to claim 39 in which said alcohol, phenol or thiol is present in an amount of at least 0.5 mole percent based on the weight of said composition.

41. The method according to claim 22 wherein the amine component includes an organic diamine having the formula $H_2N-Y-NH_2$ where Y is phenylene, diphenylene, naphthylene or a group of formula

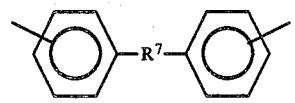

where $R^7$ is branched or linear alkylene of 1 to 20 carbon atoms,

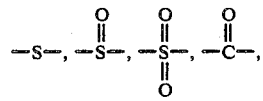

or —O—, or $R^7$ is —O—G'—O—, where G' is phenylene or group of formula

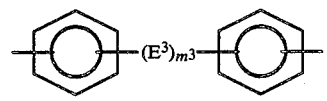

where $m^3$ is 0 or 1 and $E^3$ is

or linear or branched alkylene of 1 to 8 carbon atoms.

* * * * *